United States Patent [19]

Elmer et al.

[11] 4,039,339
[45] Aug. 2, 1977

[54] METHOD OF PREPARING GLAZES

[75] Inventors: Thomas H. Elmer; Richard E. Tischer, both of Corning, N.Y.

[73] Assignee: Corning Glass Works, Corning, N.Y.

[21] Appl. No.: 635,417

[22] Filed: Nov. 26, 1975

Related U.S. Application Data

[63] Continuation-in-part of Ser. No. 492,442, July 29, 1974, abandoned.

[51] Int. Cl.$^2$ .................. C03C 3/08; C03C 17/22
[52] U.S. Cl. .................. 106/54; 65/30 R; 106/48
[58] Field of Search ............... 106/54, 48, 50; 65/30, 65/31, 18

[56] References Cited

U.S. PATENT DOCUMENTS

| | | | |
|---|---|---|---|
| 1,526,423 | 2/1925 | Keyes | 106/54 |
| 2,106,744 | 2/1938 | Hood et al. | 65/31 |
| 2,314,824 | 3/1943 | Greene | 264/65 |
| 3,054,221 | 9/1962 | Elmer | 106/54 |
| 3,489,579 | 1/1970 | Steverding | 106/54 |
| 3,513,109 | 5/1970 | Stiles | 106/48 C |
| 3,762,936 | 10/1973 | Iler | 106/54 |
| 3,782,982 | 1/1974 | Pierson et al. | 106/75 |
| 3,827,893 | 8/1974 | Meissner et al. | 106/75 |
| 3,843,341 | 10/1974 | Hammel et al. | 65/31 |
| 3,938,974 | 2/1976 | Macedo et al. | 65/30 |
| 3,955,034 | 5/1976 | Fletcher | 106/54 X |

FOREIGN PATENT DOCUMENTS

1,492,750  7/1967  France

*Primary Examiner*—Winston A. Douglas
*Assistant Examiner*—Mark Bell
*Attorney, Agent, or Firm*—Clinton S. Janes, Jr.; Clarence R. Patty, Jr.

[57] ABSTRACT

The present invention relates to a method of producing a borosilicate glass exhibiting a low coefficient of thermal expansion, viz., less than about $20 \times 10^{-7}/°$ C. over the range of room temperature to 300° C., an ability to withstand repeated thermal cycling between room temperature and temperatures up to 1300° C. and higher without devitrification, and the ability to flow, when present in particulate form, at temperatures between about 1000°–1250° C. The method contemplates impregnating a porous, essentially alkali metal-free, high silica material with a solution or a molten mass of a $B_2O_3$-containing compound, the $B_2O_3$-containing compound also being essentially free from alkali metals. The impregnated glass is thereafter dried to eliminate any solvent. High emissivity can be imparted by incorporating minor amounts of such materials as CoO, NiO, $MoO_3$, $Fe_2O_3$, and $V_2O_5$ as dopants during the impregnation step. The impregnated material is especially useful as a glaze to provide an impervious coating on high purity silica insulating tiles.

8 Claims, No Drawings

METHOD OF PREPARING GLAZES

This application is a continuation-in-part of our copending application Ser. No. 492,442, filed July 29, 1974 and now abandoned.

U.S. Pat. Nos. 2,336,227 and 2,522,524 describe the making of graded seals for use between fused silica and metals or other glasses. The term "graded seal" referred to a length of glass which would exhibit a coefficient of thermal expansion approximating that of fused silica (about $5 \times 10^{-7}/°$ C. over the range 0°–300° C.) at one end and a higher coefficient of thermal expansion at the other which would approach that of the metal or other glass with which the seal was to be made. As an example, the manufacture of a lamp bulb or a tube for a high pressure mercury arc lamp was described. Such products required a fused silica glass envelope with tungsten electrodes or lead-in wires having a coefficient of thermal expansion of about $45 \times 10^{-7}/°$ C. over the range 0°–300° C. Prior to the patented inventions, it had been necessary to seal the metal to the glass through a series of glasses having coefficients of thermal expansion intermediate those of the tungsten and the fused silica.

The patentees disclosed the use of tubing formed from the porous, highly siliceous glass produced in accordance with U.S. Pat. No. 2,106,744 as the starting material. One end of this tubing was immersed into an aqueous boron-containing solution for a sufficient length of time to fill the pores of the tubing with the solution. In general, the solutions contained alkali metal oxides in order to yield a higher coefficient of thermal expansion. Both alkali metal-free and alkaline earth metal-containing solutions are described. The impregnated tubing was thereafter dried to remove water. Upon subsequent firing to consolidate the porous glass, lower temperatures can be employed for the impregnated portion of the tubing than for the porous glass in its original state and the impregnated portion will exhibit a higher coefficient of thermal expansion. Thus, whereas the high silica tubing, as formed, demonstrated a coefficient of thermal expansion of about $8 \times 10^{-7}/°$ C., examples of the consolidated impregnated tubing displayed coefficients of thermal expansion up to $32 \times 10^{-7}/°$ C.

The use of high purity silica materials as insulating elements has become rather prevalent in recent years. For example, tiles made from high purity silica fibers or particulate materials are commercially marketed. Such bodies exhibit the inherent high refractoriness of $SiO_2$ and the excellent thermal shock resistance resulting from the very low coefficient of thermal expansion of $SiO_2$. Such materials can be repeatedly thermal cycled to temperatures up to about 1300° C. with minimal mechanical degradation.

However, such insulating bodies are intrinsically porous, thereby reducing them susceptible to permeation by fluids and to mechanical damage from surface abuse. Therefore, there has been a need for means to develop a hard, impermeable surface layer on such products.

Hence, the primary objective of the present invention is to provide a protective coating or layer for high purity silica bodies which will be chemically and physically compatible therewith, while being able to withstand repeated thermal cycling from room temperature up to at least about 1300° C.

A further objective is to provide a protective coating for such high purity silica bodies that can be matured at sufficiently low temperatures so that distortion of the bodies is avoided.

We have found that these objectives can be accomplished utilizing a glaze consisting essentially of a high purity borosilicate composition prepared in accordance with a specifically-defined impregnation technique. Thus, a porous silica material of very high purity, preferably essentially free from alkali metal oxides, i.e., less than about 0.03% by weight, is impregnated with a $B_2O_3$-containing compound which is also of very high purity. In particular, the $B_2O_3$-containing compound, in like manner to the silica material, will be essentially free from alkali metal oxides. The purity of the $SiO_2$ and $B_2O_3$ materials is demanded to insure chemical and physical compatibility with the silica substrate to which the glaze is applied. The essential absence of alkali metals is especially required to eliminate the development of devitrification when the glazed bodies are subjected to thermal cycling or to extended exposures at high use temperatures. Furthermore, the alkali metals tend to sharply raise the coefficient of thermal expansion of the glaze.

We have discovered that additions of $B_2O_3$ in amounts up to about 20% by weight can be made to silica bodies of the proper porosity. Such additions will reduce the flow temperature of the glaze to about 1000°–1250° C., thus insuring the avoidance of distortion of the substrate while being matured. Such additions have a very small effect upon the coefficient of thermal expansion of the silica and the effect appears to be substantially linear. Therefore, the composition can be tailored to yield a desired combination of flow point and expansion coefficient.

The high purity silica base material can be derived from any source provided the necessary purity and porosity are present. Thus, the porous, highly-siliceous glass produced in accordance with U.S. Pat. No. 2,106,744, supra, is eminently suitable. Likewise useful are silica gels and solutions, colloidal solutions, and suspensions of $SiO_2$ compounds, e.g., fumed commercial silicas, which, when dried, yield a high purity microporous silica. Microporous silica bodies made in accordance with U.S. Pat. No. 3,782,982 and U.S. Pat. No. 3,827,893, and Ser. No. 440,693, filed Feb. 8, 1974, wherein the alkali metal ions are leached out, can also be employed. To insure homogeneity of composition when the glaze is consolidated while being applied to the substrate, the $SiO_2$ base material ought to have a porosity in excess of 15%, wherein the pores have diameters not exceeding about 2000A., and, preferably, will have a porosity in excess of 25% and pores within the 15–250A. range.

In Table I, granules passing a No. 10 United States Standard Sieve, but being retained upon a No. 30 Sieve (2 mm.–595 microns), of porous, highly siliceous glass made according to the method described in U.S. Pat. No. 2,106,744, supra, were heated for two hours at 90° C. and then immersed into an impregnating solution. Chemical analysis of the glass determined the presence of 3.12% $B_2O_3$, 0.25% $Al_2O_3$, and 0.01% $Na_2O$ therein. Porosity of the granules was about 28% with pore diameters ranging between about 35–50A. The impregnation was conducted at 95° C. utilizing 200 cc. of solution for each 100 grams of porous glass. The impregnating solution was contained within borosilicate laboratory glassware and the preheated granules slowly added with stirring to remove trapped air. An immersion time of three hours was employed with occasional stirring to eliminate trapped air bubbles. The solution was then drained from the container and the impregnated granules dried at 90° C. for four hours.

$H_3BO_3$ is soluble in hot water up to about 20% by weight. In comparison, up to at least 33.4% by weight $NH_4B_5O_8 \cdot 4H_2O$ can be dissolved in water at 95° C. Such is equivalent to about 21.3% $B_2O_3$, whereas a 20% $H_3BO_3$ solution is equivalent to only about 11.3% $B_2O_3$. The $NH_4B_5O_8 \cdot 4H_2O$ solutions discussed hereinafter were prepared by reacting reagent grade $H_3BO_3$ with reagent grade $NH_4OH$ to minimize the possibility of contamination.

perature range of 220°–270° C. from the beta to the alpha form which involves a large volume change.

TABLE I

| | 1 | 1 | 2 | 2 | 3 | 3 |
|---|---|---|---|---|---|---|
| Impregnation Solution | 20% $H_3BO_3$ | 20% $H_3BO_3$ | 30% $NH_4B_5O_8 \cdot 4H_2O$ | 30% $NH_4B_5O_8 \cdot 4H_2O$ | 20% $H_3BO_3$ | 20% $H_3BO_3$ |
| Thermal Treatment | — | 1350° C./1 hr. | — | 1350° C./1 hr. | — | 1350° C./1 hr. |
| Volume Shrinkage (%) | 41.0 | 40.3 | 39.2 | 33.2 | 42.3 | 41.2 |
| Apparent Density (g/cc) | 1.99 | 2.09 | 1.87 | 1.92 | 2.06 | 2.07 |
| Coefficient of Expansion (R.T. to 300° C.) | 10.8 | 12.0 | 17.5 | 17.6 | 12.4 | 14.9 |
| Analyzed Weight % $B_2O_3$ | 6.93 | 6.93 | 15.21 | 15.21 | 8.24 | 8.24 |

Consolidation of the impregnated granules was carried out in platinum crucibles and VYCOR brand calcining dishes by heating at 200° C./hour to 1000°–1200° C., depending upon the boron content of the final glass. The glasses containing the high boron values could be completely consolidated at 1000° C. in about 0.5 hour. The consolidated glass could then be ballmilled via standard techniques to the desired particle size, e.g., −325 mesh powder (44 microns), suitable for a glaze frit.

The coefficient of thermal expansion of the consolidated body is of particular importance to insure the development of a sound bond between the glaze and the silica substrate. This property was measured on bars 3 × ½ × ½ inch which were dry pressed from the −325 mesh powder using an organic binder. The binder was volatilized out at 150°–200° C. and the bars then fired at 600° C. to completely burn out any pyrolysis products. Thereafter, the bars were sintered by placing within a furnace operating at 1400° C., holding thereat for 20 minutes, and then removing. Shrinkage and apparent density were also measured on the sintered bars.

As was observed above, the glaze ought to resist devitrification during thermal cycling up to temperatures of 1300° C. and higher. This capability was checked by subjecting the 1400° C. sintered bars to a one-hour hold at 1350° C. That temperature was chosen because experience has demonstrated that the rate of devitrification of glasses formed in accordance with U.S. Pat. No. 2,106,744, supra, appears to approach a maximum there. The thermal expansion over the range of room temperature (R.T.) to 300° C. is very sensitive to devitrification since cristobalite is the crystal phase formed which undergoes a rapid inversion in the tem- Examples 1 and 3 of Table I point to a drawback encountered in using granules of relatively large size, viz., that a varying amount of impregnating solution is retained in the intergranular voids so that the boron levels measured in the sintered samples can vary even though the processing conditions are maintained constant.

Table II reports results observed on bodies containing both $B_2O_3$ and CoO. As has been noted above, the inclusion of CoO and/or $V_2O_5$ can lead to an increase in emissivity and a decrease in the high temperature conductivity of the glass. Granules of glass similar to those utilized in the borate impregnation studies recorded in Table I were heated to 90° C. for two hours and then immersed in an aqueous solution containing 15% by weight $Co(NO_3)_2 \cdot 6H_2O$ operating at 95° C., utilizing 200 cc. of solution for each 100 grams of porous glass. In like manner to the $B_2O_3$-containing solution, the CoO-containing solution will be of very high purity, essentially free from alkali metals. After a three-hour immersion with stirring, the granules were dried and heated at 400° C. until the evolution of brown fumes ceased and the cobalt nitrate had been decomposed into insoluble cobalt oxide. The boron impregnation was then carried out in like manner to that described above with reference to Table I. The impregnation with boron and cobalt can be undertaken in a single rather than a two-step technique by dissolving the cobalt nitrate in the boron-containing solution. However, the shelf life of the resulting solution is quite limited before a precipitate of cobalt borate occurs (about 0.5 hour at 80°–90° C.), so a freshly prepared solution must be used immediately.

Test bars were pressed and sintered at 1400° C. for 20 minutes and changes resulting from heat treating the sintered bars for one hour at 1350° C. were also studied in like manner to the description accompanying Table I.

TABLE II

| | 4 | 4 | 5 | 5 |
|---|---|---|---|---|
| Impregnation Solutions | 15% $Co(NO_3)_2 \cdot 6H_2O$ 20% $H_3BO_3$ | 15% $Co(NO_3)_2 \cdot 6H_2O$ 20% $H_3BO_3$ | 15% $Co(NO_3)_2 \cdot 6H_2O$ 30% $NH_4B_5O_8$ | 15% $Co(NO_3)_2 \cdot 6H_2O$ 30% $NH_4B_5O_8$ |
| Thermal Treatment | — | 1350° C./1 hr. | — | 1350° C./1 hr. |
| Volume Shrinkage (%) | 39.5 | 41.3 | — | — |
| Apparent Density (g/cc) | 1.97 | 1.87 | — | — |
| Coefficient Expansion (R.T. to 300° C.) | 12.9 | 13.8 | 16.1 | 16.8 |
| Analyzed Weight % $B_2O_3$ | 8.18 | 8.18 | 12.95 | 12.95 |
| Analyzed Weight % CoO | 0.63 | 0.63 | 0.62 | 0.62 |

To reduce the variability of boron retention observed using the granules described above, it has been found that the particles to be impregnated ought to pass a 100 mesh screen (149 microns). Therefore, in the following examples, the highly siliceous glass was comminuted into a −325 mesh powder. Standard ceramic ballmilling techniques were employed by using $ZrO_2$ balls and ammonia as a grinding aid to avoid contamination. The resulting powders were about 50% >13 microns. Chemical analysis of the powder showed 3.03% $B_2O_3$, 0.25% $Al_2O_3$, and 0.02% $Na_2O$. Porosity of the powders was about 28% with pore diameters ranging between about 35–50A. The impregnation procedure involved adding predetermined amounts of aqueous boric acid solutions to the dried powders. The impregnated powders were thereafter dried and consolidated by heating from room temperature to 1225° C. in 2.25 hours. After ballmilling the consolidated glass to −325 mesh, bars were pressed in a similar manner to that discussed above and then sintered at 1400° C. for 20 minutes. Devitrification tendencies were explored by subsequent heating at 1350° C. and measuring the coefficient of thermal expansion over the range of room temperature to 300° C. Table III reports the results.

acid by the glass is seen to take place. The coefficient of thermal expansion measurements clearly exhibit the salutary effect which the added boron content has upon retarding devitrification in the glass. Hence, even as little as 0.5% additional $B_2O_3$ can show a substantive effect, but the preferred addition will contemplate at least 1%. It is also of particular interest to note that additions of $B_2O_3$ of about 3.5% do not adversely affect the coefficient of thermal expansion. This is especially useful since the inclusion of $B_2O_3$ lowers the flow point temperature of the glaze.

A further study of the effect of $B_2O_3$ and CoO on the devitrification tendencies of the glaze is reported in Table IV. The two-step impregnation utilized in the examples reported in Table II was employed and the base glass similar to that described with respect to Table III, was present as a powder passing a 325 mesh screen Aqueous solutions of $Co(NO_3)_2 \cdot 6H_2O$ and $NH_4B_5O_8 \cdot 4H_2O$ of the proper concentration to yield the desired final $B_2O_3$ and CoO contents constituted the

TABLE III

|  | 6 | 6 | 6 |
|---|---|---|---|
| Impregnation Solution | — | — | — |
| Thermal Treatment | 1350° C./15 min. | 1350° C./30 min. | 1350° C./1 hr. |
| Coefficient Expansion (R.T. to 300° C.) | 10.7 | 15.4 | 23.2 |
| Analyzed Weight % $B_2O_3$ | 3.04 | 3.04 | 3.04 |
|  | 7 | 7 | 7 |
| Impregnation Solution | 5% $H_3BO_3$ | 5% $H_3BO_3$ | 5% $H_3BO_3$ |
| Thermal Treatment | 1350° C./15 min. | 1350° C./30 min. | 1350° C./1 hr. |
| Coefficient Expansion (R.T. to 300° C.) | 9.6 | — | 11.0 |
| Analyzed Weight % $B_2O_3$ | 3.61 | 3.61 | 3.61 |
|  | 8 | 8 | 8 |
| Impregnation Solution | 10% $H_3BO_3$ | 10% $H_3BO_3$ | 10% $H_3BO_3$ |
| Thermal Treatment | 1350° C./15 min. | 1350° C./30 min. | 1350° C./1 hr. |
| Coefficient Expansion (R.T. to 300° C.) | 9.7 | 9.6 | 10.1 |
| Analyzed Weight % $B_2O_3$ | 4.90 | 4.90 | 4.90 |
|  | 9 | 9 | 9 |
| Impregnation Solution | 15% $H_3BO_3$ | 15% $H_3BO_3$ | 15% $H_3BO_3$ |
| Thermal Treatment | 1350° C./15 min. | 1350° C./30 min. | 1350° C./30 min. |
| Coefficient Expansion (R.T. to 300° C.) | 9.1 | 9.2 | 9.5 |
| Analyzed Weight % $B_2O_3$ | 5.66 | 5.66 | 5.66 |
|  | 10 | 10 | 10 |
| Impregnation Solution | 20% $H_3BO_3$ | 20% $H_3BO_3$ | 20% $H_3BO_3$ |
| Thermal Treatment | 1350° C./15 min. | 1350° C./30 min. | 1350° C./1 hr. |
| Coefficient Expansion (R.T. to 300° C.) | 9.7 | 9.7 | 9.9 |
| Analyzed Weight % $B_2O_3$ | 6.50 | 6.50 | 6.50 |

The data of Table III illustrate that the $B_2O_3$ content in the glass increases linearly with the strength or concentration of the solution utilized for impregnation, thereby indicating that during the impregnation process the concentration of the boric acid in the solution within the pores becomes equal to that in the impregnant. In other words, no preferential absorption of boric acid by the glass is seen to take place. The coefficient of impregnants. Consolidation of the impregnated powders was conducted at 1000°–1200° C. and test bars prepared by sintering at 1400° C. for 20 minutes. Property measurements were secured on the sintered bars and on sintered bars which had been subsequently fired at 1350° C. for one hour to observe any devitrification tendency.

TABLE IV

|  | 11 | 11 | 12 | 12 |
|---|---|---|---|---|
| Thermal Treatment | — | 1350° C./1 hr. | — | 1350° C./1 hr. |
| Volume Shrinkage (%) | 42.3 | 41.2 | 39.5 | 41.3 |
| Apparent Density (g/cc) | 2.06 | — | 1.97 | 1.98 |
| Coefficient Expansion (R.T. to 300° C.) | 12.4 | 14.9 | 12.9 | 13.8 |
| Weight % $B_2O_3$ | 8.24 | 8.24 | 8.18 | 8.18 |
| Weight CoO | 0 | 0 | 0.63 | 0.63 |
|  | 13 | 13 | 14 | 14 |
| Thermal Treatment | — | 1350° C./1 hr. | — | 1350° C./1 hr. |
| Volume Shrinkage (%) | 36.4 | 37.3 | 45.1 | — |
| Apparent Density (g/cc) | 2.17 | 2.17 | 2.32 | — |
| Coefficient Expansion (R.T. to 300° C.) | 12.9 | 13.5 | 14.7 | 15.6 |

TABLE IV-continued

| | | | | |
|---|---|---|---|---|
| Weight % $B_2O_3$ | 8.18 | 8.18 | 8.18 | 8.18 |
| Weight % CoO | 2.0 | 2.0 | 5.0 | 5.0 |

Table IV clearly illustrates the resistance of these glasses to devitrification as is exhibited by the observation of only a very slight increase in the coefficient of expansion after the 1 hour heat treatment at 1350° C. As a matter of fact, the measurements appear to indicate that the inclusion of CoO up to about 2% improves the resistance of the glass to devitrification. Nevertheless, the data show that the addition of CoO ought to be held below about 5% since the expansion definitely appears to be on the increase at that point.

Several samples of impregnated glass particles containing 2% CoO were fired at 600° C. in an atmosphere of flowing forming gas (92% $N_2$, 8% $H_2$) to produce reducing conditions such that the resultant glass contained a dispersed phase of very fine cobalt metal crystals. The reduced glass had a black appearance and could be sintered into a bar at 1400° C. in air without reoxidizing the cobalt metal. The coefficient of thermal expansion of the reduced glass was essentially identical to that of the oxidized glass, both before and after a 1 hour heat treatment at 1350° C.

Table V reports the effect of $V_2O_5$ additions to the base high purity silica glass doped with $B_2O_3$. The $V_2O_5$ was added in the form of vanadyl oxalate ($VOC_2O_4$) of high purity, a compound readily soluble in water, which was prepared through the reaction of reagent grade $V_2O_5$ and oxalic acid. Both of those materials were essentially free from alkali metals. Solutions containing the equivalent of 0.1 g $V_2O_5$/ml solution and 0.2 g $V_2O_5$/ml solution were prepared by slowly adding $V_2O_5$ to a stirred aqueous solution of oxalic acid. After the evolution of heat and $CO_2$ ceased, the solutions were subsequently heated to complete the reaction. Thereafter, the solutions were filtered and stored for use.

Unlike the practice described above with respect to the CoO + $B_2O_3$-doped glasses, a single-step impregnation technique was employed with the $V_2O_5$ + $B_2O_3$-doped glasses, although the two-step impregnation method is equally effective. A slight precipitation occurred when the vanadyl oxalate was added to the $NH_4B_5O_8.4H_2O$ solution, but this could be redissolved by carefully adding concentrated $NH_4OH$.

Powder passing a 325 mesh screen of the highly siliceous glass produced in accordance with U.S. Pat. No. 2,106,744, supra, was mixed with an aqueous solution of $VOC_2O_4$ + $NH_4B_5O_8.4H_2O$ at 95° C. After a one-hour soak, the particles were dried and then heated to 400° C. for a sufficient length of time to secure complete conversion of the oxalate to $V_2O_5$. Consolidation of the particles was possible at temperatures between about 1000°–1200° C., depending upon the amount of boron incorporated.

Table V records property measurements obtained on 3 × ½ × ⅛ inch test bars pressed in accordance with the above-described technique and sintered at 1400° C. for 20 minutes. Measurements were also made on such bars that had been further heat treated at 1350° C. for 1 hour. Examples 15 and 16 represent impregnation of the glass with $VOC_2O_4$ alone, the $B_2O_3$ content reported being that in the original glass.

TABLE V

| | 15 | 15 | 16 | 16 | 17 | 18 |
|---|---|---|---|---|---|---|
| Thermal Treatment | — | 1350° C./1 hr. | — | 1350° C./1 hr. | — | 1350° C./1 hr. |
| Volume Shrinkage (%) | 45.7 | 46.3 | 43.2 | 44.3 | — | — |
| Apparent Density (g/cc) | 2.23 | 2.26 | 2.25 | 2.24 | — | — |
| Coefficient Expansion (R.T. to 300° C.) | 8.5 | 61.3 | 8.0 | 78.1 | 11.5 | 11.1 |
| Analyzed Weight % $B_2O_3$ | 2.91 | 2.91 | 2.79 | 2.79 | 8.0 | 8.0 |
| Analyzed Weight % $V_2O_5$ | 3.00 | 3.00 | 7.30 | 7.30 | 2.0 | 2.0 |

Table V shows that large amounts of $V_2O_5$ promote the formation of cristobalite [devitrification] in the high purity silica glasses where the $B_2O_3$ content is low. However, by raising the $B_2O_3$ content, the tendency of the glass to devitrify can be so reduced that up to, perhaps, 5% $V_2O_5$ can be safely added, but no more than about 3% is preferred.

As was the case with the CoO-doped glasses, the $V_2O_5$-doped particles can be consolidated in a reducing environment. X-ray diffraction analyses of the resulting black-colored product gave a complex trace of weak lines for lower vanadium oxides, but a specific oxide was not identified. The reduced glass was only slightly less resistant to devitrification than those consolidated under oxidizing conditions.

In like manner to cobalt and vanadium, it is possible to dope the high silica materials of this invention with nickel, iron, and/or molybdenum in amounts up to about 5% by weight total. For example, high purity aqueous solutions of such compounds as nickel nitrate hexahydrate [$Ni(NO_3)_2.6H_2O$], ammonium permolybdate [$3(NH_4)_2.0.5MoO_3.2MoO_4.6H_2O$], and/or ferric nitrate [$Fe(NO_3)_2.9H_2O$] perform very satisfactorily as impregnants. Following drying, the impregnated glass can be heated to convert the nitrate and/or molybdate to NiO, $MoO_3$, and/or $Fe_2O_3$. Consolidation can then be undertaken at 1000°–1200° C., depending upon the amount of boron content of the glass. A total of about 5% of these additions, singly or in combination, has been adjudged to be a practical maximum in order to avoid the possibility of devitrification. Also, in like manner to cobalt and vanadium, consolidation conducted in a reduced environment can increase the emissivity of the final product.

Reagent grade silicic acid passing a 325 mesh screen was heated to 95° C. for two hours. An aqueous solution of 30% by weight or 15% by weight $NH_4B_5O_8.4H_2O$ at 95° C. was added to the silicic acid powder, 100 cc. of solution/100 g of powder. After allowing to stand for 30 minutes at 95° C., the mixture was allowed to dry overnight at 60° C. After being heated at 300° C. for one hour, the powders were rapidly heated (furnace rate) to 1000° C. where they completely consolidated.

The consolidated material was comminuted, the powder resulting therefrom formed into test bars in like manner to that described above, and the bars sintered at 1400° C. for 20 minutes. Some bars were also subjected to the one hour heat treatment at 1350° C. to test for devitrification resistance. Table VI reports the results of several physical property measurements conducted on the samples.

TABLE VI

|  | 19 | 19 | 20 | 20 | 21 | 21 |
|---|---|---|---|---|---|---|
| Thermal Treatment | — | 1350° C./1 hr. | — | 1350° C./1 hr. | — | 1350° C./1 hr. |
| Volume Shrinkage (%) | 32.9 | 32.9 | — | — | — | — |
| Apparent Density (g/cc) | 2.02 | 2.00 | — | — | — | — |
| Coefficient Expansion (R.T. to 300° C.) | 11.1 | 41.5 | 8.0 | 9.1 | 8.5 | 9.0 |
| Weight % $B_2O_3$ | 2.0 | 2.0 | 4.2 | 4.2 | 6.07 | 6.07 |

|  | 22 | 22 | 23 | 23 |
|---|---|---|---|---|
| Thermal Treatment | — | 1350° C./1 hr. | — | 1350° C./1 hr. |
| Volume Shrinkage % | — | 40.2 | — | — |
| Apparent Density (g/cc) | 1.95 | 1.84 | 1.90 | 1.85 |
| Coefficient Expansion (R.T. to 300° C.) | 15.0 | 14.6 | 22.2 | 22.0 |
| Weight % $B_2O_3$ | 11.59 | 11.59 | 18.61 | 18.61 |

Example 19 indicates the presence of impurities in the silicic acid, probably alkali metals, although chemical analysis was not undertaken on the material. Thus, the presence of 2% $B_2O_3$ was not a sufficient amount to restrain devitrification. However, greater amounts of $B_2O_3$ suppress devitrification tendencies and the property measurements indicate that the microporosity of the silicic acid renders it suitable for a starting material.

Example 19 is especially suitable in illustrating the requirement of high purity in the ingredients utilized. This purity level is particularly demanded with the alkali metals which are preferably held below 0.02% to avoid devitrification even under the most adverse thermal conditions. In general, the sum of all extraneous oxides other than, of course, CoO, $Fe_2O_3$, $MoO_3$, NiO, and $V_2O_5$, will not exceed about 5%. An exception to that generality is $TiO_2$ which, as is noted in U.S. Pat. No. 2,326,059, can lead to glasses exhibiting very low coefficients of thermal expansion when present in amounts of about 5-11%.

The following two examples were designed to illustrate the criticality of maintaining the alkali metal content at a very low level and, most preferably, entirely absent.

EXAMPLE 22

Porous particles similar to those reported above with respect to Examples 1-3 were heated for two hours at 90° C. and immersed into an aqueous solution containing 1.65% by weight $NaNO_3$ at a temperature of 95° C. for three hours. After drying the particles overnight at 130° C., consolidation thereof was accomplished by heating in an electrically-fired furnace at about 1160° C. for 0.1 hour. The temperature of the furnace was raised from about 100° C. to 1160° C. in approximately four hours.

The consolidated glass, containing about 3% $B_2O_3$, 0.25% $Al_2O_3$, and 0.15% $Na_2O$, was thereafter ballmilled to pass a No. 325 United States Standard Sieve. Standard test bars 3 × ½ × ½ inch were dry pressed from the −325 mesh powder and sintered for 20 minutes at 1400° C. The bars exhibited a coefficient of thermal expansion of about 51.1 × $10^{-7}$/° C. over the range of R.T. to 300° C. Subsequently subjecting the bars to a one-hour hold at 1350° C. resulted in the coefficient of thermal expansion thereof rising to about 89.1 × $10^{-7}$/° C. over the range of R.T. to 300° C.

An examination of the surface of the latter bars through a light microscope showed the presence of an integral crystalline surface layer thereon, the crystals being cristobalite. The surface, itself, was crazed or microcracked, thus rendering it susceptible to permeation by fluids.

French Patent No. 1,492,750 describes a method for producing borosilicate glass frits which are very high in silica content, but wherein the alkali metal content is not controlled. The following example provides a glass comparable in composition to that resulting from the sole exemplary embodiment set forth in that patent.

EXAMPLE 23

Porous particles similar to those described above in Example 22 were heated for two hours at 90° C. and immersed into an aqueous solution containing 10% by weight $H_3BO_3$ and 1.65% by weight $NaNO_3$ at a temperature of 95° C. for three hours. After drying the particles overnight at 130° C., the particles were placed in an electrically-fired furnace, heated to 1160° C. over a period of four hours, and held at that temperature for about 0.1 hour to consolidate the particles.

The consolidated glass, containing about 4.9% $B_2O_3$, 0.25% $Al_2O_3$, and 0.15% $Na_2O$, was ballmilled to pass a No. 325 United States Standard Sieve. Standard test bars 3 × ½ × ½ inch were dry pressed from the −325 mesh powder and sintered according to the following schedule in an electrically-fired furnace. The temperature was raised from room temperature to 600° C. at 10° C./minute. That temperature was held for one hour after which the bars were heated to 1450° C. at a rate of 8° C./minute. Upon reaching 1450° C., the electric current to the furnace was cut off and the bars allowed to cool to room temperature retained within the furnace. A coefficient of thermal expansion (R.T. to 300° C.) of about 12 × $10^{-7}$/° C. was measured.

The bars were then heated to 1350° C. and maintained at that temperature for about one hour. A coefficient of thermal expansion (R.T. to 300° C.) of about 21 × $10^{-7}$/° C. was measured. In like manner to the bars of Example 22 which had been fired at 1350° C. for one hour, examination of the surface thereof employing a light microscope showed crazing or microcracking, rendering it susceptible to permeation by fluids. An integral crystallized surface layer was observed having a thickness of about 300 microns. The crystals present appeared to be cristobalite.

Therefore, it is quite apparent that the presence of alkali metal must be essentially absent, i.e., less than about 0.03% by weight in order to avoid the development of devitrification under the most stringent conditions.

Although the previous exemplary embodiments of the invention have involved the use of aqueous solutions, since such have been considered the most convenient and least expensive, it will be appreciated that other solutions can be employed as long as such are of high purity. In particular, the solutions must be essentially free from alkali metals. For example, molten boric acid is feasible as is a solution of boron trioxide in methyl alcohol. In general, a useful liquid will flow within the pores but not react deleteriously with the base high silica glass. Upon heating, the liquid will be converted and a residue of $B_2O_3$ will be left within the pores. The impregnated material can then be fired in the normal manner to incorporate the boron into the glass structure.

We claim:

1. A method for making an essentially alkali metal-free, high purity borosilicate glass having a coefficient of thermal expansion (R.T. to 300° C.) less than about $20 \times 10^{-7}/°$ C., a flow point when present in particulate form between about 1000°–1250° C., and the ability to withstand thermal cycling to 1300° C. and higher without substantial devitrification, which comprises the steps of:
    a. impregnating porous, essentially alkali metal-free, high purity silica material having a porosity of at least 25% and pore diameter ranging between about 15–250A. with an essentially alkali metal-free, boron-containing liquid;
    b. consolidating said impregnated porous material by heating to about 1000°–1250° C. to yield a high purity, non-porous borosilicate glass containing at least about 1%, but not more than about 20% by weight, $B_2O_3$, and wherein the total alkali metal oxide does not exceed about 0.03% by weight.

2. A method according to claim 1 wherein said boron-containing liquid is an aqueous solution of $H_3BO_3$.

3. A method according to claim 1 wherein said boron-containing liquid is an aqueous solution of $NH_4B_5O_8.4H_2O$.

4. A method according to claim 1 wherein said boron-containing liquid is molten boric acid.

5. A method according to claim 1 wherein said porous, high purity silica material is prepared in accordance with the method of U.S. Pat. No. 2,106,744.

6. A method according to claim 1 wherein said porous, high purity silica material is powdered silicic acid.

7. A method according to claim 1 wherein said porous, high purity silica material is also impregnated with an essentially alkali metal-free liquid containing at least one metal selected from the group consisting of cobalt, iron, nickel, molybdenum, and vanadium such that said consolidated high purity, non-porous borosilicate glass will also contain up to about 5% by weight total of at least one member of the group consisting of CoO, $Fe_2O_3$, NiO, $MoO_3$, and $V_2O_5$.

8. A method according to claim 1 wherein the total alkali metal oxide content of said consolidated high purity, non-porous borosilicate glass does not exceed about 0.02% by weight.

* * * * *